(12) United States Patent
Croot et al.

(10) Patent No.: US 8,792,361 B2
(45) Date of Patent: Jul. 29, 2014

(54) DYNAMIC LINE MANAGEMENT OF DIGITAL SUBSCRIBER LINE CONNECTIONS

(75) Inventors: Christopher Marcus Croot, Bury St Edmunds (GB); Ashley Pickering, Ipswich (GB); Trevor Philip Linney, Stowmarket (GB); Philip Antony Everett, Ipswich (GB); John Wolsey Cook, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 20 days.

(21) Appl. No.: 13/260,114

(22) PCT Filed: Mar. 19, 2010

(86) PCT No.: PCT/GB2010/000504
§ 371 (c)(1),
(2), (4) Date: Dec. 22, 2011

(87) PCT Pub. No.: WO2010/112809
PCT Pub. Date: Oct. 7, 2010

(65) Prior Publication Data
US 2012/0099424 A1    Apr. 26, 2012

(30) Foreign Application Priority Data

Mar. 31, 2009  (EP) .................................... 09250968

(51) Int. Cl.
*H04L 12/26* (2006.01)
(52) U.S. Cl.
USPC ......................................................... 370/248
(58) Field of Classification Search
USPC .......................................... 370/248–253, 535
See application file for complete search history.

(56) References Cited

U.S. PATENT DOCUMENTS

| 5,134,685 A | 7/1992 | Rosenbluth |
| 5,889,470 A | 3/1999 | Kaycee et al. |

(Continued)

FOREIGN PATENT DOCUMENTS

| EP | 1079658 | 2/2001 |
| EP | 1748671 | 1/2007 |

(Continued)

OTHER PUBLICATIONS

International Search Report for International Application No. PCT/GB2010/000504 dated May 11, 2010.

(Continued)

*Primary Examiner* — Ricky Ngo
*Assistant Examiner* — Wei-Po Kao
(74) *Attorney, Agent, or Firm* — Patterson Thuente Pedersen, P.A.

(57) ABSTRACT

A Digital Subscriber Line Access Multiplexor (DSLAM) for operation within an access network includes a plurality of digital subscriber line modems for terminating a plurality of corresponding digital subscriber lines and aggregating them for onward connection through the access network. The DSLAM is operable, each time a data connection is established or re-established over one of the digital subscriber lines, to generate line data about the data connection at the DSLAM, to store the line data, to wait a predetermined period of time, to determine if the data connection is still operating successfully since the establishment of the connection without having suffered loss of connection during the predetermined period and then to transmit the line data to a management device which performs dynamic line management based on the data.

17 Claims, 4 Drawing Sheets

(56) References Cited

U.S. PATENT DOCUMENTS

| | | |
|---|---|---|
| 6,374,288 B1 | 4/2002 | Bhagavath et al. |
| 6,473,851 B1 | 10/2002 | Plutowski |
| 6,546,089 B1 | 4/2003 | Chea et al. |
| 6,580,727 B1 | 6/2003 | Yim et al. |
| 6,782,884 B1 | 8/2004 | Chen et al. |
| 6,879,639 B1 | 4/2005 | Verbin et al. |
| 6,963,538 B1 | 11/2005 | Giroux et al. |
| 6,975,597 B1 | 12/2005 | Baker et al. |
| 7,013,244 B2 | 3/2006 | Cherkassky |
| 7,047,304 B2 | 5/2006 | Senapati et al. |
| 7,058,122 B2 | 6/2006 | Brown et al. |
| 7,076,556 B1 | 7/2006 | Brock et al. |
| 7,130,870 B1 | 10/2006 | Pecina et al. |
| 7,489,693 B2 | 2/2009 | Xu |
| 7,660,601 B2 | 2/2010 | Janik et al. |
| 7,684,325 B2 | 3/2010 | Defoort et al. |
| 7,752,151 B2 | 7/2010 | Nugent |
| 7,860,029 B2 | 12/2010 | Sekine et al. |
| 7,930,399 B2 | 4/2011 | Brown et al. |
| 7,979,370 B1 | 7/2011 | Ershov |
| 7,986,686 B2 | 7/2011 | Nadeau et al. |
| 8,005,018 B2 | 8/2011 | Magnone et al. |
| 8,027,270 B1 | 9/2011 | Campana et al. |
| 8,031,619 B2 | 10/2011 | Gross et al. |
| 8,068,584 B2 | 11/2011 | Wu et al. |
| 8,116,218 B2 | 2/2012 | Lv et al. |
| 8,144,580 B2 | 3/2012 | Pickering et al. |
| 8,300,528 B2 | 10/2012 | Everett et al. |
| 8,406,135 B2 | 3/2013 | Pickering et al. |
| 8,537,701 B2 | 9/2013 | Croot et al. |
| 2002/0085626 A1 | 7/2002 | Starr |
| 2002/0136203 A1 | 9/2002 | Liva et al. |
| 2002/0141443 A1 | 10/2002 | Christensen et al. |
| 2003/0182666 A1 | 9/2003 | You |
| 2003/0236760 A1 | 12/2003 | Nugent |
| 2004/0120390 A1 | 6/2004 | Brown et al. |
| 2004/0146072 A1 | 7/2004 | Farmwald |
| 2005/0021716 A1 | 1/2005 | Adamczyk et al. |
| 2005/0021739 A1 | 1/2005 | Carter et al. |
| 2005/0047535 A1 | 3/2005 | Ahmed et al. |
| 2005/0123028 A1 | 6/2005 | Cioffi et al. |
| 2005/0174938 A1 | 8/2005 | Richardson et al. |
| 2005/0237940 A1 | 10/2005 | Tennyson |
| 2006/0072722 A1 | 4/2006 | Savoor et al. |
| 2006/0114818 A1 | 6/2006 | Canali et al. |
| 2006/0121854 A1 | 6/2006 | Abhishek et al. |
| 2006/0198430 A1 | 9/2006 | Rhee et al. |
| 2006/0224532 A1 | 10/2006 | Duan et al. |
| 2008/0095188 A1 | 4/2008 | Remy et al. |
| 2008/0292021 A1* | 11/2008 | Lv et al. .................. 375/316 |
| 2009/0103559 A1 | 4/2009 | Pickering et al. |
| 2009/0262647 A1 | 10/2009 | Pickering et al. |
| 2010/0195666 A1 | 8/2010 | Adamczyk et al. |
| 2010/0290362 A1 | 11/2010 | Croot et al. |
| 2010/0293274 A1 | 11/2010 | Everett et al. |
| 2011/0191472 A1 | 8/2011 | Croot et al. |
| 2011/0274009 A1 | 11/2011 | Cooper |
| 2011/0274101 A1 | 11/2011 | Cooper |
| 2012/0026873 A1 | 2/2012 | Spinar et al. |

FOREIGN PATENT DOCUMENTS

| | | |
|---|---|---|
| EP | 1953959 | 8/2008 |
| EP | 1995942 | 11/2008 |
| EP | 2073446 | 6/2009 |
| EP | 2209324 | 7/2010 |
| EP | 2209325 | 7/2010 |
| WO | WO0212497 | 2/2002 |
| WO | WO0235793 | 5/2002 |
| WO | WO03/009541 | 1/2003 |
| WO | WO2004/091144 | 10/2004 |
| WO | WO2005057315 | 6/2005 |
| WO | WO2006103557 | 10/2006 |
| WO | WO2007/012867 | 2/2007 |
| WO | WO2007/012867 A1 * | 2/2007 |
| WO | WO2007/012869 | 2/2007 |

OTHER PUBLICATIONS

International Search Report for International Application No. PCT/GB2009/002329 dated Dec. 23, 2009.
International Search Report for International Application No. PCT/GB2010/000016 dated May 6, 2010.
International Search Report for International Application No. PCT/GB2010/000013 dated May 6, 2010.
Kee Bong Song et al., "Dynamic Spectrum Management for Next-Generation DSL Systems", IEEE Communication Magazine, IEEE Serice Center. vol. 40 No. 10, Oct. 1, 2002. p. 102.
Vanbleu, Advanced Equalization Techniques for DMT-Based Systems. Oct. 2004.
Anonymous: ADSL2 and ADSL2+—The New ADSL Standards. White Paper. Oct. 2006. Copyright 2002.
Anonymous: Asymmetric Digital Subscriber Line (ADSL) transceivers—Extended bandwith ADSL2 May 2003.
"Dynamic Line Management for Digital Subscriber Lines" Alcatel Technology White Paper. Jul. 12, 2007.
TR-130 xDSL EMS to NMS Interface Functional Requirements. Feb. 2007.
Application and File History for U.S. Appl. No. 13/144,902, filed Jul. 15, 2011, inventor Cooper.
Application and File History for U.S. Appl. No. 13/144,904, filed Jul. 15, 2011.
Application and File History for U.S. Appl. No. 13/121,905, filed Mar. 30, 2011, inventors Croot et al.
International Search Report for International Application No. PCT/GB2008/004213 mailed May 13, 2009.
European Search Report for European Application No. EP07255001.5 dated Jul. 1, 2008.
Silverman et al., "G. gen" G.vsdl: G. ploam, "New Reporting and Control to Improve the Carriers Ability to Optimie VDSL2"—ITU Telecommunication Standardization Section. Temporary Document SD-075, ASSIA Inc. San Diego. CA Jan. 15-19, 2007. (8 pages).
Verlinden et al., "Dynamic Spectrum Management for Digital Subscriber Lines", Edition 2, White Paper. Alcatel 2005. (12 pages).
Bostoen et al., "Optimizing DSL for multimedia services", Alcatel Telecommunications Review. Jun. 2005. pp. 155-159.
Application and File History for U.S. Appl. No. 12/809,798, filed Jun. 21, 2010, inventors Croot et al.
Written Opinion and International Search Report for International Application No. PCT/GB/2006/002818 dated Sep. 25, 2006.
Extended European Search Report for European Application No. EP06251521.8 dated Sep. 6, 2006.
International Search Report and Written Opinion for International Application No. PCT/GB2006/002826 mailed Sep. 26, 2006.
European Search Report for European Application No. EP05254769 dated Jan. 23, 2006.
Anschutz, "DSL-Evolution-Architecture Requirements for the Support of QoS-Enabled IP Service", Technical Report DSL Forum TR-059, Sep. 1, 2003. 48 pages.
Application and File History for U.S. Appl. No. 11/989,136, filed Jan. 22, 2008, inventors Pickering et al.
Application and File History for U.S. Appl. No. 11/989,408, filed Jan. 25, 2008, inventors Pickering et al.
Chinese First Notification of Office Action and Search Report for Chinese Application No. 201080014466.7 dated Nov. 4, 2013. English Translation provided.
European Office Action for European Application No. 10711070.2 dated Feb. 28, 2013.
European Result of consultation for European Application No. 10711070.2 dated Jul. 25, 2013.
Comments on International Search Report and Written Opinion of the International Searching Authority for European Application No. 10711070.2 dated Sep. 7, 2011.

* cited by examiner

DYNAMIC LINE MANAGEMENT OF DIGITAL SUBSCRIBER LINE CONNECTIONS

RELATED APPLICATIONS

The present application is a National Phase entry of PCT Application No. PCT/GB2010/000504, filed Mar. 19, 2010, which claims priority from European Patent Application No. 09250968.6, filed Mar. 31, 2009, the disclosures of which are hereby incorporated by reference herein in their entireties.

TECHNICAL FIELD

The invention relates to the dynamic management of Digital Subscriber Line (DSL) connections, which is often referred to as Dynamic Line Management (DLM).

BACKGROUND

DSL connections enable large bandwidth connections to be established over legacy twisted copper pair connections originally designed to carry simple voice calls only. The techniques employed to achieve this are sophisticated and ensuring that the correct settings are used in the DSL modems at either end of the connection in order to achieve an optimum balance between throughput characteristics (e.g. bandwidth, delay, jitter, etc.) and reliability characteristics (e.g. number of errors or errored seconds, number of resynchronizations, etc.) in a large access network is non-trivial.

Dynamic Line Management (DLM) systems attempt to monitor the behavior of lines and control their operation in order to improve the performance of the lines. The control is generally exerted by a central management device processing data resulting from the monitoring of the lines and based on that processing selecting a profile for use by the network side DSL modem (e.g. located in a Digital Subscriber Line Access Multiplexor (DSLAM), a Multi Services Access Node (MSAN) or other similar aggregation device) for use with that line.

The DSL modems themselves collect a large amount of data about the performance of the connection and this information can be useful to the centralized management function in deciding what profile should be selected for use by the network-side DSL modem (note the profile specifies values for particular parameters required by the DSL modem in order to set up the connection, such as a target signal to noise margin value and a level of interleave value, which parameters are discussed in greater detail below).

However, because an access network is likely to contain a large number of DSLAMs (or MSAN's etc.) they have generally been designed to operate as autonomously as possible. As such, although they will generally store some useful data about each digital subscriber line (hereinafter referred to simply as a "line") to which it is connected such as the theoretical maximum rate at which the line could have been connected last time an ADSL connection was set up over the line, each DSLAM traditionally operates according to a server client model where each DSLAM operates as a server and only reacts to requests issued to it from a client. Thus in order to obtain some of the useful information stored on the DSLAM's it has been necessary generally to request the desired information and so the traditional model was to request this information periodically. This resulted in time critical information not being found out about and acted upon as quickly as might otherwise have been the case.

WO 2007/012867 describes an improvement to this situation in which DSLAM's operate proactively to transmit certain time critical pieces of information about a DSL as soon as it has synchronized in order for such time critical data to be notified to a management device as soon as possible so that, if necessary, appropriate action may be taken as soon as possible.

EP 1 995 942 A describes a DLM system in which DSL parameters are taken in respect of each DSL with a frequency which depends upon the stability of the line, such that parameters are taken in respect of stable lines only fairly infrequently whereas parameters from fairly unstable lines are taken with a relatively high frequency such that problems occurring on unstable lines may be detected and acted upon relatively quickly without wasting huge resources collecting parameters in respect of stable lines on a relatively frequent basis.

U.S. Pat. No. 5,889,470 A describes a DSL access device Management Information Base (MIB) which allows the remote management of a DSL access device by using a constructed enterprise DSL MIB to define a plurality of objects that describe the operation of a DSL access device. These objects are used to monitor the performance of, and if desired, send commands to the DSL access device.

However, each DSLAM/MSAN, etc. actually stores a large amount of useful data such as the bit loading per sub-carrier as well as the Signal to Noise Ratio (SNR) per sub-carrier which is also available as soon as the connection has been established and it would be desirable to provide an efficient mechanism for providing this data to a central processing station where the data can be processed.

SUMMARY OF THE INVENTION

According to an embodiment, there is provided a method of operating an access network including a plurality of data connections between end user devices and an aggregation transceiver device where the connections are aggregated for onward connection through the access network, the method comprising: each time a data connection is established or re-established, generating line data about the data connection at the aggregation device and, in respect of at least a majority of the line data, performing the following steps: prior to transmitting this data, storing it at the aggregation device; waiting a predetermined period of time; determining if the data connection is still operating successfully since the establishment of the connection without having suffered loss of connection during the predetermined period; and then transmitting the line data to another device; wherein only the most recently generated line data is kept as current data, all old data from earlier data connection establishments or re-establishments being deleted when new line data is generated, such that at least the majority of the line data is sent only in the event that the data connection operates successfully for at least the predetermined period of time after an establishment or re-establishment of the connection. In an embodiment, the other device is a central point for processing of the line data or an intermediate device from which the data (possibly after some processing such as aggregation with data from other aggregation devices, etc.) is then further forwarded to or towards a central processing point. A small amount of line data (e.g. giving some basic information about the line rate at which the connection has been set up as well as providing an indication that a reconnection has occurred, etc.) can be generated and sent immediately upon establishment or re-establishment of the data connection in order that very unstable lines can be detected and appropriate action taken.

According to an embodiment, there is provided an aggregation device operating within an access network and including a plurality of digital subscriber line modems for terminating a plurality of corresponding digital subscriber lines and aggregating them for onward connection through the access network, the access device being operable, each time a data connection is established or re-established over one of the digital subscriber lines, to generate line data about the data connection at the aggregation device, and, in respect of at least a majority of the generated line data, to perform the following additional steps: to store the line data at the aggregation device, to wait a predetermined period of time, to determine if the data connection is still operating successfully since the establishment of the connection without having suffered loss of connection during the predetermined period and then to transmit the line data to another device (which can be a central point for processing of the line data or an intermediate device which will then forward on the data towards a central point for processing (or for further processing) of the line data) wherein only the most recently generated line data is kept as current data, all old data from earlier data connection establishments or re-establishments being deleted when new line data is generated, such that at least the majority of the line data is sent only in the event that the data connection operates successfully for at least the predetermined period of time after an establishment or re-establishment of the connection.

In an embodiment, in addition to keeping back at least the majority of the data for onward transmission only in the event that a predetermined period (which is, in an embodiment, at least one minute in duration and is set, in an embodiment, to a duration of two minutes) of stable connection is experienced, some time critical data is transmitted straightaway as soon as the connection has been established. Such data can be the data described in WO2007/012867, which is hereby incorporated by reference herein in its entirety, such as, for example, the line rate at which the connection has been established, especially if this differs from the line rate at which it had previously been established prior to the (re-) resynchronization. In an embodiment, the data which is kept back and not transmitted until the predetermined waiting period (of two minutes, in an embodiment) has elapsed is much more voluminous in size. For example, useful data to include in the latter transmission is the bit loading (i.e. the number of bit assigned to each sub carrier in the connection) as well as the measured signal to noise ratio (and/or margin) for each sub-carrier. The bit loading is stored and maintained (as it can change over time due to bit switching between sub-carriers, etc.) in a Bit Allocation Table (BAT) by the DSL modem in the aggregation device.

A typical access network architecture to which embodiments are applicable includes a plurality of Digital Subscriber Line Access Multiplexors (DSLAM's) and/or MultiService Access Nodes (MSAN's) which (both) act as a point of convergence where a plurality of DSL lines are terminated and connected on via aggregated, higher bandwidth connections to the main network (e.g. to the Internet). Typically (though not necessarily or exclusively) the DSLAM's or MSAN's (or other aggregation transceiver device) are located at a local exchange (as they are called in the UK) or equivalent premises owned and controlled by a network operator. Each of these aggregation transceiver devices or aggregation points (e.g. a DSLAM or MSAN) aggregates a number of lines which are generally located within a reasonably small geographical area, although the actual size will vary, usually in dependence upon the average population density of the area, etc. If a Fibre To The Cabinet (FTTC) architecture is being adopted, then the DSLAM's can actually be mini-DSLAM's located in a cabinet and serving just a few houses within a street or small estate of houses, etc. and then an optical backhaul connection connects the mini DSLAM in the cabinet to an access node (e.g. an MSAN) in the local exchange. Any line data (e.g. about a particular line operated by the mini-DSLAM) can then be transmitted to the central management function via the access node using the backhaul connection which can be shared with user data carried over the DSL lines and thus this line data represents overhead data which should ideally therefore be kept to a minimum.

By keeping back the more voluminous data that a DSLAM or MSAN etc. can usefully transmit to (or towards) a central location, it prevents excessive data from being transmitted in the event that the line in question is unstable and is having to resynchronize frequently. In such cases, the most important issue is to try to get the line operating under a profile which allows it to connect stably, and the details of the bit loading etc. can wait until the line has been placed into a stably working order. Furthermore, since the amount of data involved can be fairly large, it is generally wasteful to repeatedly send this larger quantity of data every few seconds if the line is "flapping" (i.e. frequently resynchronizing), especially since the data is unlikely to have changed much between retransmissions, nor is it likely to be of much use, since the first step is likely going to be to move the line onto a much less aggressive profile. This is especially so in an FTTC environment where the connection from the mini-DSLAM to the access node is shared with the user data.

In embodiments, each DSLAM can transmit the messages which it generates to a device such as an element manager or a data collector which interfaces between, or aggregates messages received from, a subset of the total number of DSLAMs operating within the access network and then forwards the (possibly aggregated) messages to a centralized management function (which can be distributed over a number of separate hardware devices) for further processing of the messages and subsequent control of other devices within the access network (and possibly beyond the access network, e.g. to an associated service provider etc.).

The term Digital Subscriber Line Access Multiplexer (DSLAM) is a well known term in the art and the term is used throughout this specification to refer to such devices, but is also intended to include any device housing one or more units (e.g. ATU-C's) which terminate (at the network end of a twisted copper pair line) an xDSL connection (xDSL refers to any of the standards for transmitting much more than 64 kb of data over a copper line, by using frequencies greater than those required for transmitting analogue voice signals, such standards including ADSL SDSL, HDSL and VDSL—further including any further similar standards not yet developed), since subsequent devices might not be known as DSLAMs even though they perform a similar function (i.e. of terminating a number of digital subscriber lines and aggregating them into a higher bandwidth transmission medium of an access network). By comparison with the Technical Report of the DSL Forum TR-059, the term DSLAM as we intend it to be used is more closely aligned to the term "Access Node" used in that document. The term "Access Device or Subsystem" is also intended to be understood in this way.

In an embodiment, two main parameters which control the operation of xDSL connections are varied to generate different profiles, the target Signal-to-Noise Ratio (SNR) margin and the interleave depth (e.g. switching between fast mode (no interleave) and interleave mode (an interleave depth of one).

The SNR margin represents the amount of redundancy built into the selected number of bits (out of a maximum of 15 bits per sub-carrier per symbol) assigned to each sub-carrier (for a given set of values for the other connection options such as amount of Forward Error Correction (FEC), Trellis coding, etc.) for each sub-carrier of the connection, given the measured value of the actual SNR experienced by the modem for that respective sub-carrier. Thus, each possible set of significant values for the connection parameters (i.e. number of bits allocated to the sub-carrier, level of trellis coding, level of interleave, etc.) has a corresponding baseline SNR which represents the minimum value of the SNR for that sub-carrier at which the sub-carrier would be expected to operate with a Bit Error Rate (BER) of $10^{-7}$ (i.e. 1 bit is expected to be in error for every $10^7$ bits); this BER of $10^{-7}$ is called the target bit error rate as the connection is expected to operate very well with this level of BER. The SNR margin represents the amount (in decibels) by which the actual measured SNR exceeds this baseline amount. Each profile specifies a target SNR margin which specifies the minimum size of the margin which each sub-carrier should be set up at, at the time of setting up the connection such that the actual received SNR can vary over time, after setting up the connection, below the measured amount at setting up the connection by up to the amount of the target margin and still the connection would be expected to operate with a BER of less than or equal to the target amount (i.e. at least as good as the target BER).

The definition of SNR margin which is given in the xDSL standard ITU G992.1 Section 9.5.1 is: "Signal-to-Noise Ratio (SNR) margin: The signal-to-noise ratio margin represents the amount of increased received noise (in dB) relative to the noise power that the system is designed to tolerate and still meet the target BER of $10^{-7}$, accounting for all coding (e.g. trellis coding, RS FEC) gains included in the design. The SNR margin ranges from −64.0 dB to +63.5 dB with 0.5 dB steps."

It will thus be appreciated, that the lower the SNR Margin, the higher the headline bit rate that will be achievable (i.e. assuming that there are no errors). Likewise, the higher the SNR Margin, the more likely that the connection will operate in a stable manner, even in a fluctuating noise environment.

Fast/interleave mode switches the depth of interleave between no interleave (FAST mode) and any of the depths of interleave defined in the currently applicable ADSL standards (e.g. the ITU G.992.x standards). In many implementations, only the lowest level of interleave (a depth of 2, where units in a single code word which are adjacent before interleaving are separated by one interleaved unit from another word after interleaving) is used at the moment; however, this can change in the future. As is well known in the art, use of interleave protects against short duration noise spikes by interleaving units (e.g. bytes) of a certain number (depending on the depth of interleave) of code words (each comprising several units) where each code word has a certain amount of error protection such that a relatively small number of errored units per code word can be recovered by the error protection mechanism to recover the original code word completely (e.g. if there are 5 units (e.g. bytes) per code word and the error correction mechanism can recover code words where one unit is errored, an interleave depth of 2 would enable both interleaved words to both be recovered if a noise caused two adjacent units within a two word transmission period to become corrupted). Interleaving provides protection against impulsive noises at the expense of increased latency (and greater buffering requirements of network equipment).

Further embodiments provide computer programs and carrier means or media carrying such programs, especially tangible carrier means such as optical storage devices (e.g. compact discs (CD's) or DVD's), or magnetic storage devices such as magnetic discs, or non-volatile solid-state memory devices, as set out in the accompanying claims.

The central management function which ultimately receives the line data uses the data which it receives to perform Dynamic Line Management (DLM) which involves deciding the most suitable profile to use for the line in question. It also ensures that the BRAS controlling the rate at which data can flow to the line is appropriately configured (to avoid excessive data from reaching the DSL line at a rate which the DSL line cannot support). The central management function can be performed by a single large computer or can be distributed over a large number of computers, etc.

BRIEF DESCRIPTION OF THE DRAWINGS

Embodiments will now be described, by way of example only, with reference to the accompanying drawings in which.

DETAILED DESCRIPTION

Figure 1:
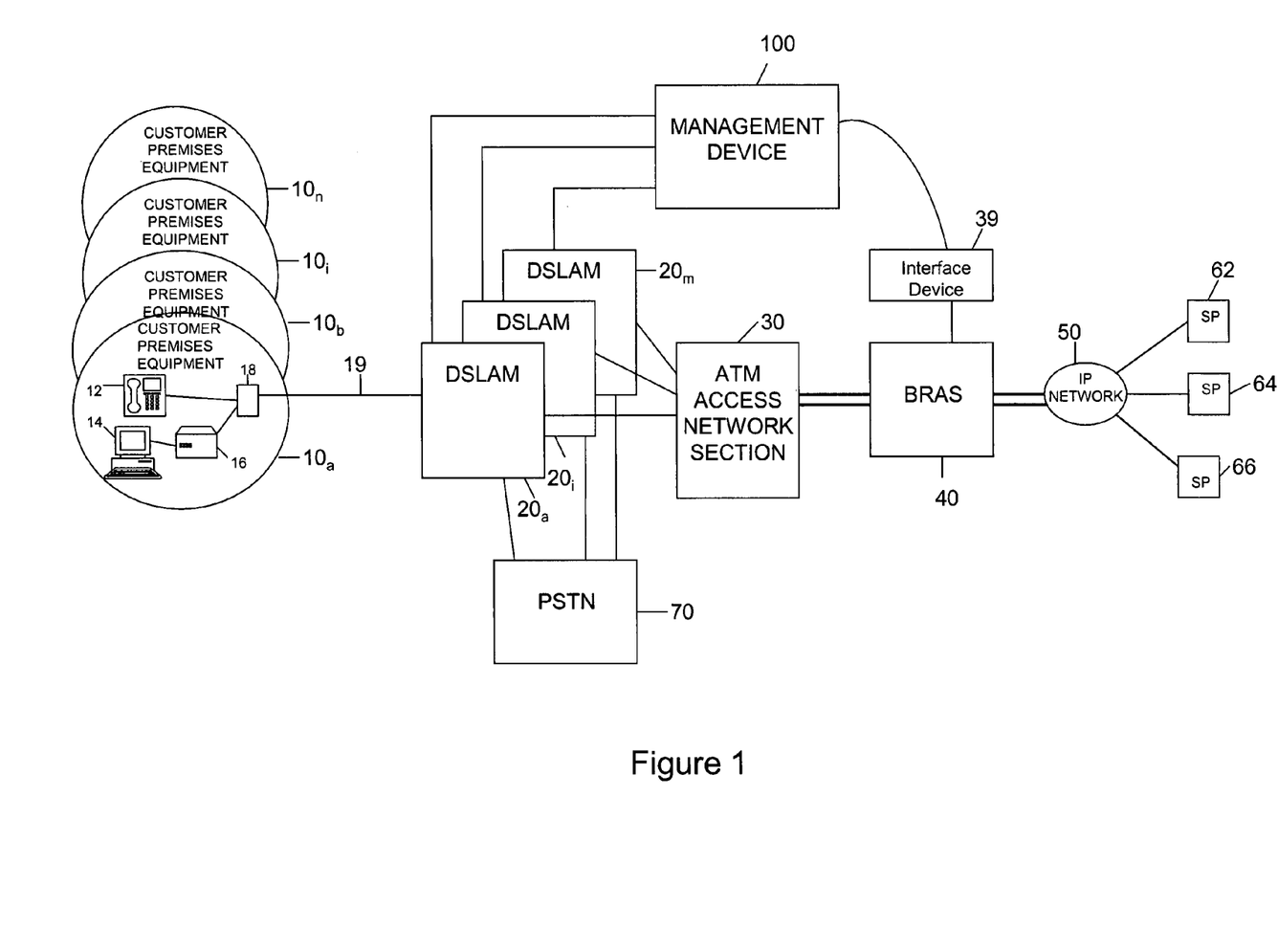
FIG. 1 is a schematic block diagram illustrating a telecommunications network incorporating a plurality of DSLAMs according to an embodiment.

Referring to FIG. 1, an embodiment is illustrated in overview. Copper pair loops 19 connect a number of sets of customer premises equipment $10_a$, $10_b$ ... $10_i$ ... $10_n$ to a smaller number of DSLAMs $20_a$ ... $20_i$ ... $20_j$. Each DSLAM is typically located within a local exchange (also known as a central office in the US) each of which can house one or more DSLAMs. Each DSLAM 20 separates normal voice traffic and data traffic and sends the voice traffic to the Public Switched Telephone Network (PSTN) 70. The data traffic is passed on through a core Access Network section 30 (which will typically be an ATM network section as is assumed in this embodiment) to a Broadband Remote Access Server (BRAS) 40 at which several IP traffic flows from (and to) multiple Service Providers (SP's) 62, 64, 66 are aggregated (and disaggregated) via an IP network 50 (which can itself be provided on top of an ATM network). Note that although only a single BRAS is shown, in practice a large access network will include a large number of BRAS's. Within each set of customer premises equipment 10, there is typically an ADSL splitter filter 18, a telephone 12, an ADSL modem 16 and a computer 14.

In another embodiment, the DSLAM's can be replaced with mini-DSLAM's located in cabinets in an FTTC architecture, with optical backhaul connections between the mini-DSLAM's and an access node such as an MSAN located in the local exchange. In such a case, both voice traffic and data traffic can be sent via the same backhaul connection and then voice traffic can be separated onto the PSTN by the access node at the exchange. Alternatively, in a full IP voice network, the voice and data can all be carried together as data throughout the network, etc.

In addition to the above mentioned items, in an embodiment, there is also a management device 100 which communicates between the DSLAMs 20 and the BRAS (or BRAS's) 40. In an embodiment, the management device communicates with individual BRAS's via one or more further interface devices 39 each of which communicates directly with one or more BRAS's in order to set user profiles, etc. A detailed understanding of the operation of the management device, the interface device(s) and the BRAS(s) is not required in order to understand the embodiments. However, for completeness an overview of their operation is set out below. For a more detailed discussion, the reader is referred to co-pending European patent application No. 05254769.2 the contents of which are incorporated herein by reference. Thus, in overview, the management device 100 obtains information from each DSLAM 20 about the rate at which each Digital Subscriber Line (DSL) connects to the DSLAM (as is discussed in greater detail below, in an embodiment this is done by each DSLAM generating and transmitting to the management device 100 a message indicating the new line rate each time a line connects up at a speed which differs from the speed at which the line last connected up—or synchronized as this process is commonly termed).

In an embodiment, the management device then processes this information to assess a consistent connection speed achieved by each such DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with.

The exact algorithm used by the management device to calculate the consistent rate is not described. However, it should be noted that the intention of the algorithm is to arrange that the user will receive data at the highest rate which his/her DSL is consistently able to obtain without requiring the BRAS to be reconfigured every time the DSL is connected. At the same time the algorithm seeks to ensure that if the DSL connects at a rate which is below that at which the BRAS is currently configured to allow data through, then the BRAS is quickly reconfigured to avoid overloading the DSLAM. The reason for wanting to avoid having to contact the BRAS each time a DSL connects to the DSLAM is because with current systems it is not generally possible to reconfigure the BRAS without a significant delay (e.g. of a few minutes). Furthermore, there is a limit to the rate at which a BRAS can process reconfiguration requests. These restrictions are sometimes referred to by saying that the BRAS needs to be provisioned, and drawing a distinction between systems which are switched (e.g. ATM Switched Virtual Circuits) and systems which are provisioned. Current systems allow for quite quick provisioning (often a matter of minutes rather than days or weeks) but there is still a significant difference between such quick provisioning and realtime switching.

Figure 2:
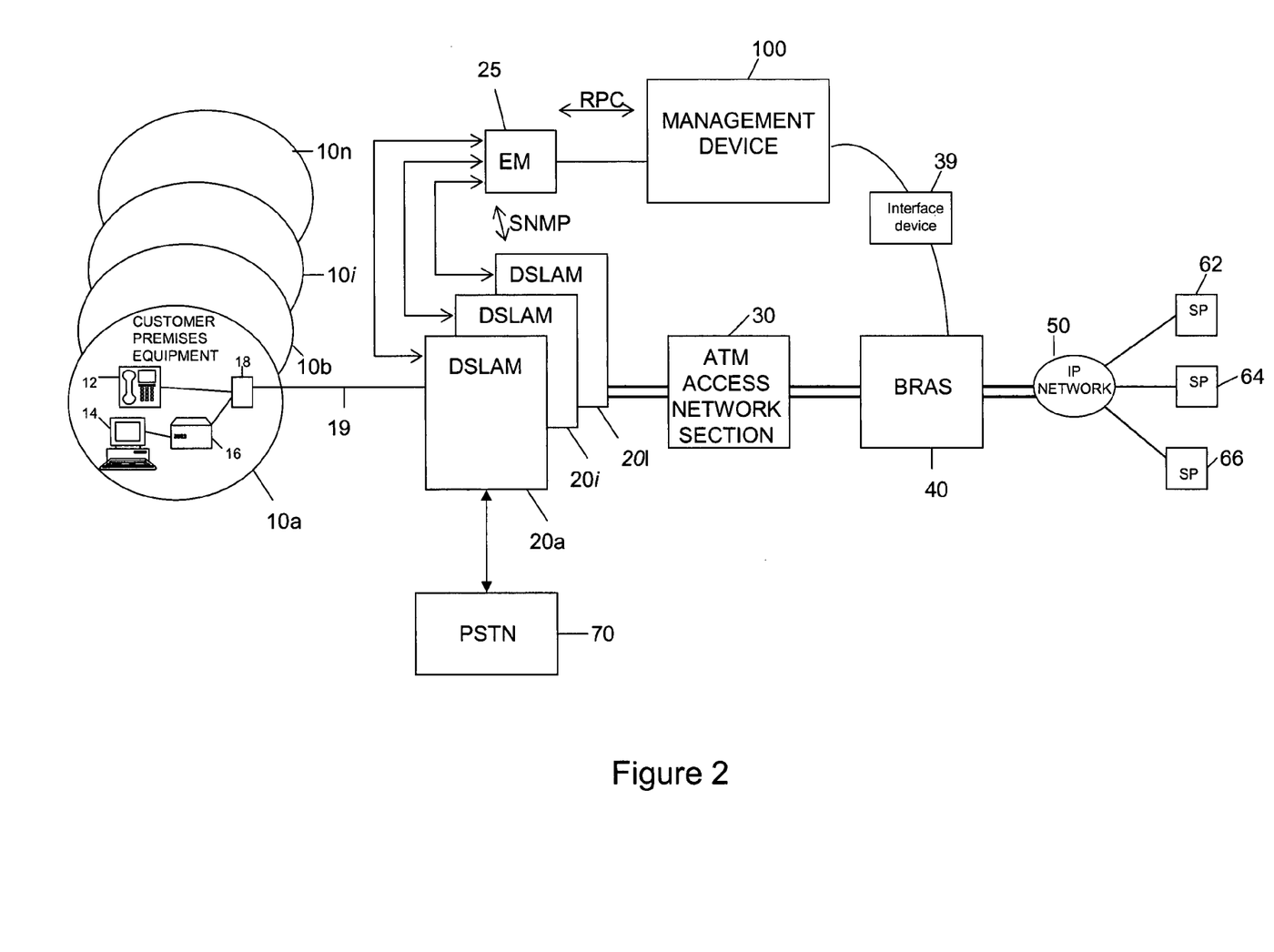
FIG. 2 is a schematic block diagram illustrating an alternative telecommunications network similar to that of FIG. 1, but further including a plurality of element manager devices which interface between a subset of the DSLAMs and a management device which ultimately receives messages from the DSLAMs according to an embodiment.

FIG. 2 shows an alternative embodiment to that of FIG. 1 which is very similar and common reference numerals have been used to describe common elements. The main difference is simply that in FIG. 2, instead of the DSLAMs communicating notification messages directly to the management device 100, an element manager device 25 (which connects to a plurality of DSLAMs) acts as an interface between the DSLAMs and the management device. Note that in a large access network, there can be many DSLAMs and several element managers, each of which can connect to a sub-set of the DSLAMs. Furthermore, additional levels of hierarchy can be imposed where a number of element managers communicate with an element manager which then interfaces to the management device, etc.

The embodiment of FIG. 2 can be operated in at least two slightly different ways in order to generate and transmit notifications to the management device 100. Firstly, each DSLAM can perform monitoring and determine whenever a condition or set of conditions has arisen which requires a notification to be passed to the management device 100 in which case the DSLAM can generate the notification and send it to the element manager 25 (using, for example the well known SNMP protocol as illustrated in FIG. 2) whereupon the element manager 25 then simply forwards on the notification message to the management device (e.g. using a Remote Procedure Call (a well known Java based protocol) as illustrated in FIG. 2). Alternatively, each DSLAM can simply forward on a notification to the element manager each time a DSL synchronizes (again for example using SNMP) and the element manager can process this information to determine if a notifiable event has occurred (e.g. such as the synchronization line rate for a particular line having changed). Then if the element manager determines that such an event has occurred, it can generate and transmit (again using, for example an RPC) a suitable notification message to the management device 100. In this latter method of operation, a group of DSLAMs and their corresponding element manager form an access sub-system within the meaning of the term as used in the appended claims.

However, there are two distinct types of notifiable events: time critical events and non-time critical events. If a line is repeatedly re-synching (even at the same rate) this constitutes a time critical notifiable event in its own right and the DSLAM can send this notification up the chain towards the management device. Also, if the line resynchs at a lower rate than that at which it was previously synchronized (or at least at a rate which is below a minimum rate associated with the rate at which the BRAS for that line is configured, if this rate is known to the DSLAM), this also constitutes a time-critical notifiable event which should be sent immediately up stream towards the management device. On the other hand if the line resynchs at the same or a higher speed than that at which it was previously synchronized (or at least equal to or above the minimum rate supported by the current configuration of the BRAS), this represents a non-time critical notifiable event. This amount of data required to describe this event is small and so the DSLAM can either send it immediately and let a higher up device decide if it needs to forward on the info or not, and if so when, or the DSLAM can make such decisions itself. Finally, there is a third category of notification, which concerns non-time critical events which require a large amount of data to describe (e.g. the bit-loading per sub-carrier and the measured SNR and/or SNM on each sub-carrier). For this type of notification the DSLAM should wait for a predetermined period to ensure that the connection is reasonably stable before attempting to send this data. This is discussed in greater detail below with reference to FIG. 4.

Figure 3:
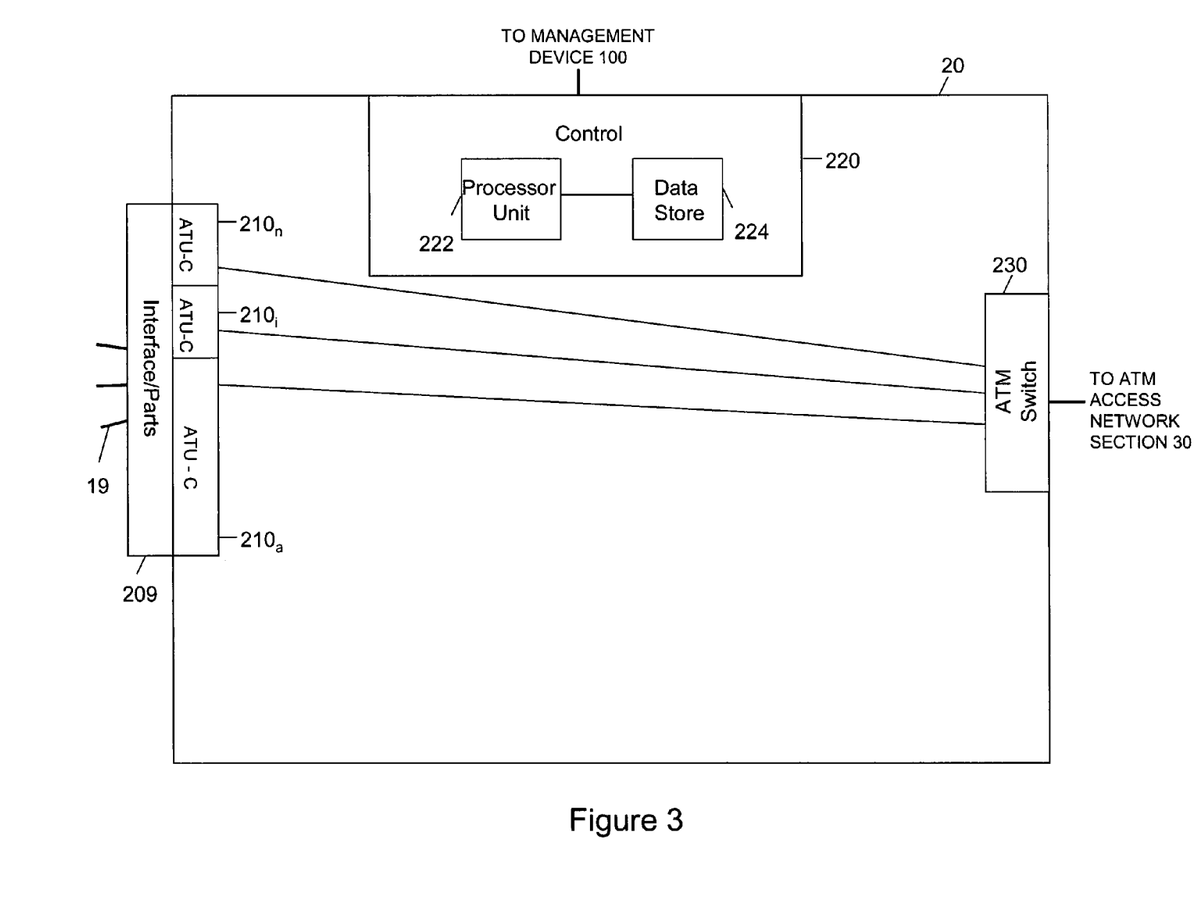
FIG. 3 is a schematic block diagram illustrating one of the DSLAMs of FIG. 1 in more detail according to an embodiment.

Referring now to FIG. 3, this shows a DSLAM of FIG. 1 (or FIG. 2) in slightly more detail. Each incoming DSL line terminated by the DSLAM enters the DSLAM at one of a plurality of input ports in an interface module 209, which connects these to a plurality of modems, in this case a plurality of ADSL Terminating Units—Central office side (ATU-C's) 210a-n. The ATU-C's are connected to an ATM switch for forwarding on the data (in the form of ATM cells in an embodiment) to an ATM switch 230 which switches the resulting cells onto the ATM section 30 of the access network. Within the DSLAM, there is a control unit 220 which includes a processor unit 222 and a data store 224. The control unit 220 performs various control functions including ensuring that each time a connection is made over a particular DSL that it complies with a stored profile for that line. As is well known within the field of xDSL, each line is set up according to a DSL profile which specifies various parameters necessary for establishing an xDSL connection.

In an embodiment, the control unit 220 additionally performs the function of monitoring each DSL, determining if a time critical notifiable event has occurred and, if so, generating a notification message to send to the management device 100 (or to an element manager or other intermediate device in alternative embodiments including such devices) immediately, and/or waiting for a predetermined stability period (of 2 minutes in an embodiment) and then sending any non-time critical notifications. The steps carried out in performing this additional function are described below with reference to the flow diagram of FIG. 4.

Figure 4:
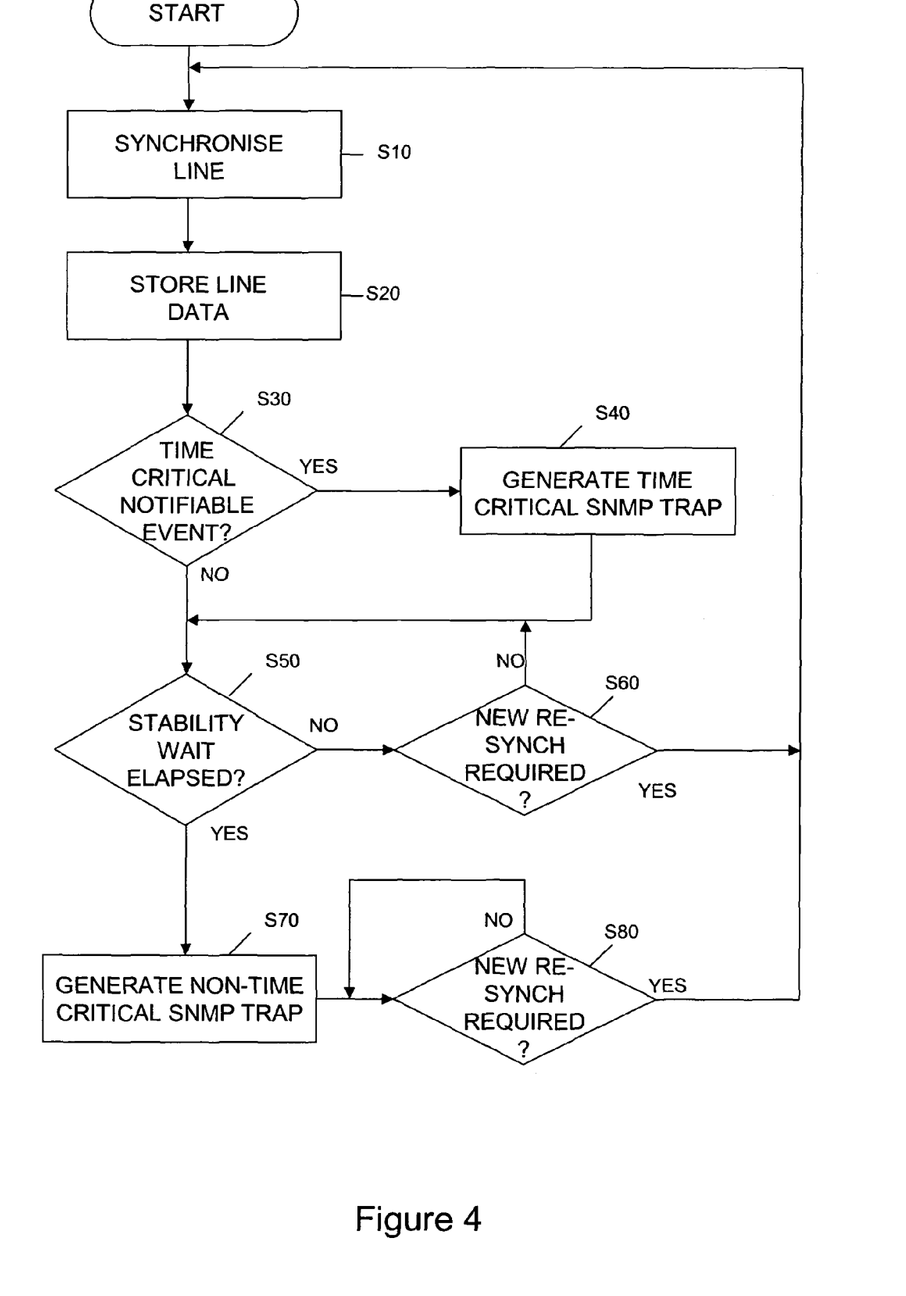
FIG. 4 is a flow diagram illustrating the steps carried out by the DSLAM of FIG. 3 to generate messages to send to the management device of the network of FIG. 1 according to an embodiment.

Thus, upon initiation of the method illustrated in FIG. 4 when a DSL line connected to the DSLAM is provisioned for monitoring by this new function (e.g. because the end user has opted to move his broadband connection service to a new rate adapted service), whenever it synchronizes (or resynchronizes) (step 10), line data such as the line rate achieved, bit loading data, SNR and/or SNM data per sub-carrier etc. is stored (step S20). The control unit then determines (at step S30) if a time critical notifiable event (such as the line resynchronizing at a lower rate than it was previously synchronized at) has occurred. If so the method proceeds to step S40 where a corresponding (time critical) notification is prepared and sent as a Simple Network Message Protocol (SNMP) trap message which it transmits directly (or indirectly in alternative embodiments) to the management device 100 and then the method proceeds to step S50. If at step S30 it is determined that there is no time critical notifiable event to notify, then the method simply bypasses step S40 and proceeds directly to step S50.

At step S50 the control unit determines if the stability wait period (which in an embodiment is set to equal 2 minutes) for that line has elapsed; if it has not then the method proceeds to step S60 where it determines if a resynchronization is required, if so the method returns to step S10 otherwise it returns to step S50. If at step S50 it is determined that the stability period has elapsed, then the method proceeds to step S70. The effect of steps S50 and S60 together is that the control unit waits until the stability period has elapsed without a resynchronization being required before proceeding to step S70, but if a resynchronization is required before the period is elapsed, the method returns to step S10 without making it to step S70 (on that occasion).

At step S70 the control unit generates a non-time critical notification message in the form of an SNMP trap which it again transmits directly (or indirectly in alternative embodiments) to the management device 100. The method then proceeds to step S80 to await a new request or requirement to resynchronize the line.

In an embodiment, the above described functionality is performed in parallel in respect of each line which is terminated by the DSLAM.

It will be understood by a person skilled in the art that a number of different methods can be used to transmit the messages between the DSLAMs, element managers and the management device 100. In the embodiment of FIG. 1 an SNMP message is sent directly from the DSLAMs to the management device 100. However many other possibilities exist. For example, in the embodiment of FIG. 2 an SNMP message can be sent from the DSLAMs to the element manager which can then forward on the message using a CORBA interface or by means of a JAVA based Remote Procedure Call. Many other possibilities will occur to a person skilled in the art of data networking.

As mentioned above, time critical events which should be reported before awaiting elapsment of the wait period can include simply the fact of a resynchronization having occurred. This can be useful for identifying lines which are frequently going down, perhaps because the provisioning is incorrect and needs to be changed (e.g. to force the line to connect at a lower rate rather than at the maximum achievable rate).

Alternatively, the DSLAM or an element manager or other interface type device can monitor whether a particular line has had to resynchronize more than a certain given number of times within a certain given period such as, for example, more than 10 times within an hour and send a time-critical notification to (or towards) the management device whenever this condition is detected as occurring rather than each time a line resynchronizes (unless the line resynchronizes at a lower rate than previously, or at a rate lower than a specified minimum rate (equal to or corresponding to the rate at which the BRAS has been provisioned for that respective line, in an embodiment).

The invention claimed is:

1. A method of operating an access network including a plurality of data connections between end user devices and an aggregation transceiver device where the connections are aggregated for onward connection through the access network, the method comprising:
   each time a data connection is established or re-established, generating line data about the data connection at the aggregation device; and
   storing the line data at the aggregation device;
   after a predetermined period of time, determining if the data connection has operated successfully since the establishment of the connection without having suffered loss of connection during the predetermined period; and
   transmitting the line data to another device only in the event that the above determination is positive, but otherwise not transmitting the line data; wherein
   if a loss of connection is suffered during the predetermined period of time, then the line data is replaced by new line data generated during a subsequent re-establishment of the connection and a new period of waiting is commenced prior to attempting to transmit the new line data to the another device.

2. A method according to claim 1 wherein the aggregation transceiver device is as digital subscriber line access multiplexor.

3. A method according to claim 2 wherein the another device is one of an access node within a local exchange, an element manager, or a central management system.

4. A method according to claim 2 further comprising, prior to the elapse of the predetermined period of time, determining if a time critical notifiable event has occurred and if so transmitting data describing the time critical notifiable event to the other device or to the elapse of the predetermined period of time.

5. A method according to claim 2 wherein, if the connection is not maintained for at least the predetermined period of time without suffering loss of connection, then the old line data is replaced by new line data generated during a subsequent automatic re-establishment of the connection without transmission of the old data to the another device and a new period of waiting is commenced before attempting to transmit the new, current line data.

6. A method according to claim 1 wherein the another device is one of an access node within a local exchange, an element manager or a central management system.

7. Non-transitory carrier means carrying a non-transitory computer program or suite of non-transitory computer programs for causing the method of claim 6 to be carried out during execution of the program or programs.

8. A method according to claim 1 further comprising, prior to the elapse of the predetermined period of time, determining if a time critical notifiable event has occurred and if so transmitting data describing, the time critical notifiable event to the another device prior to the elapse of the predetermined period of time.

9. Non-transitory carrier means carrying a non-transitory computer program or suite of non-transitory computer programs for causing the method of claim 8 to be carried out during execution of the program or programs.

10. A method according to claim 1 wherein the line data, which is transmitted only after the elapse of the predetermined period of time, includes the bit loading data of the line.

11. Non-transitory carrier means carrying a non-transitory computer program or suite of non-transitory computer programs for causing the method of claim 10 to be carried out during execution of the program or programs.

12. Non-transitory carrier means carrying a non-transitory computer program or suite of non-transitory computer programs for causing the method of claim 1 to be carried out during execution of the program or programs.

13. A method according to claim 1 wherein the line data, which is transmitted only after the elapse of the predetermined period of time, includes the bit loading data of the line.

14. An aggregation device operating within an access network and including a plurality of digital subscriber line modems for terminating a plurality of corresponding digital subscriber lines and aggregating them for onward connection through the access network, the aggregation device being operable, each time a data connection is established or re-established over one of the digital subscriber lines, to generate line data about the data connection at the aggregation device to store the line data at the aggregation device, and, in respect of at least a majority of the generated line data, to transmit the data to another device only after the elapse of a predetermined period of time, whereby the line data is transmitted to the another device only if the data connection is still operating successfully since the most recent establishment of the connection without suffering a loss of connection during the predetermined period, whereas if a loss of connection is suffered during the predetermined period, then the line data is replaced by new line data generated during a subsequent re-establishment of the connection and a new period of waiting is commenced prior to attempting to transmit the new line data to the another device.

15. An aggregation device according to claim 14 wherein the aggregation device is a digital subscriber line access multiplexor for location at a local exchange or similar building or a mini digital subscriber line access multiplexor for location in a street cabinet or similar housing.

16. An access network including a plurality of aggregation devices according to claim 15.

17. An access network including a plurality of aggregation devices according to claim 14.

* * * * *

UNITED STATES PATENT AND TRADEMARK OFFICE
CERTIFICATE OF CORRECTION

| | | |
|---|---|---|
| PATENT NO. | : 8,792,361 B2 | Page 1 of 1 |
| APPLICATION NO. | : 13/260114 | |
| DATED | : July 29, 2014 | |
| INVENTOR(S) | : Croot et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Thirteenth Day of October, 2015

Michelle K. Lee
*Director of the United States Patent and Trademark Office*